Oct. 22, 1940. R. K. PARSELL 2,218,875
METHOD AND APPARATUS FOR VIEWING PICTURES IN STEREOSCOPIC RELIEF
Filed Sept. 17, 1937 2 Sheets-Sheet 1
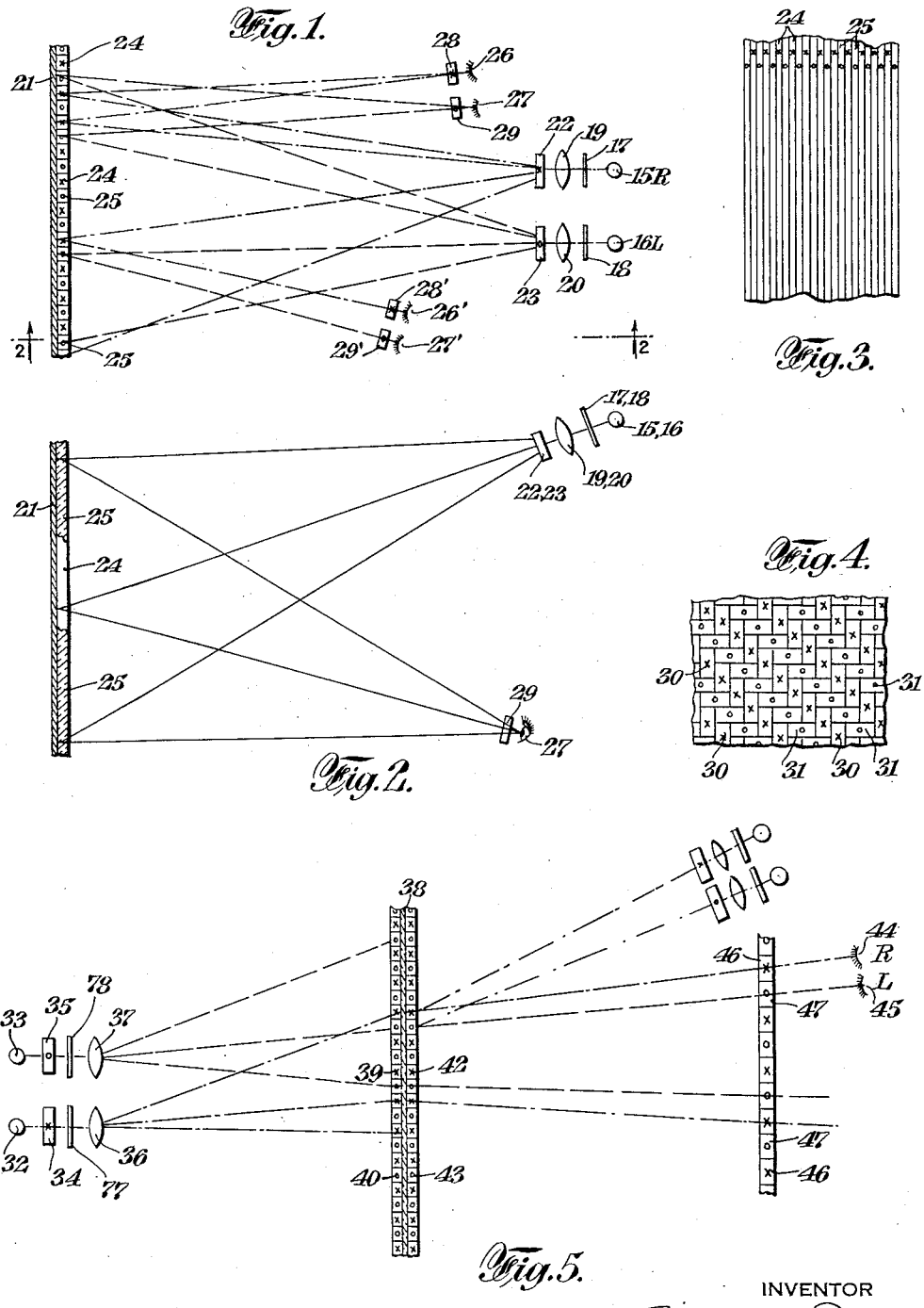
INVENTOR
Richard K. Parsell.

Oct. 22, 1940. R. K. PARSELL 2,218,875
METHOD AND APPARATUS FOR VIEWING PICTURES IN STEREOSCOPIC RELIEF
Filed Sept. 17, 1937 2 Sheets-Sheet 2
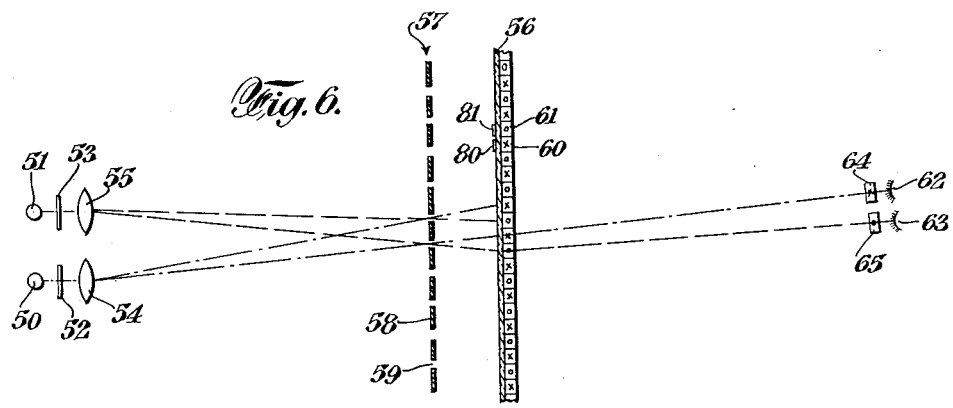
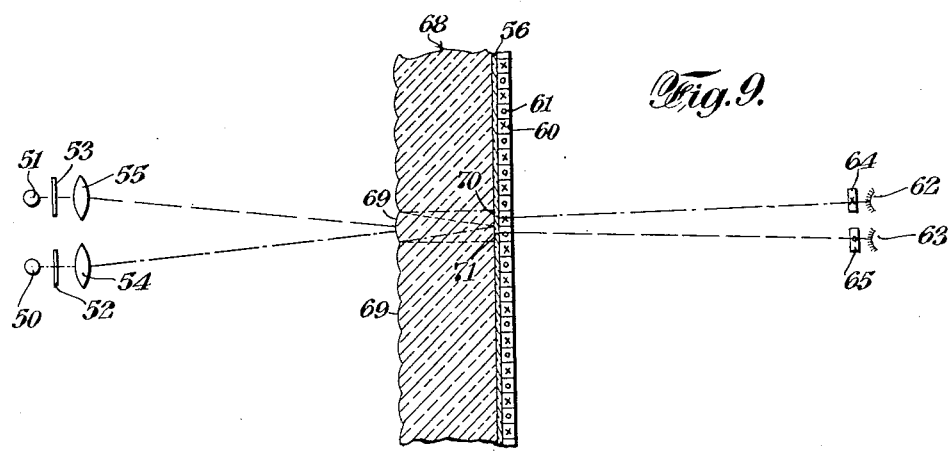
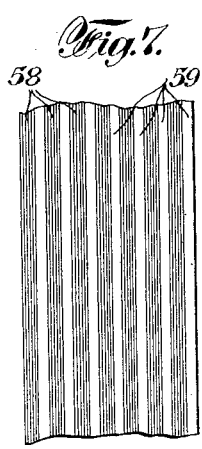 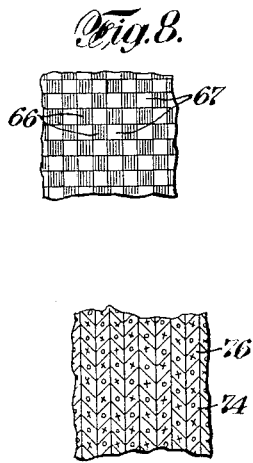  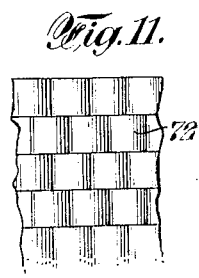
INVENTOR
Richard K. Parsell.

Patented Oct. 22, 1940

2,218,875

UNITED STATES PATENT OFFICE 2,218,875

METHOD AND APPARATUS FOR VIEWING PICTURES IN STEREOSCOPIC RELIEF

Richard K. Parsell, Brooklyn, N. Y.

Application September 17, 1937, Serial No. 164,268

12 Claims. (Cl. 88—16.6)

This invention relates to the projection of pictures so as to be viewable in stereoscopic relief.

It is a purpose of this invention to afford method and apparatus whereby a picture of a subject including a right view and a left view may be produced on an image screen and may be viewable by the right and left eyes of an observer in sterescopic relief. The projection may be of still pictures or motion pictures.

It is an advantage of this invention that a picture may be projected so as to be viewable in stereoscopic relief using standard photographic apparatus. It is a further advantage that the photographed subject may be projected so as to be viewable in a most high degree of stereoscopic relief.

Features of this invention include that right and left views of a subject are caused to be produced on an image screen as a plurality of image elements with the image elements of the right view independent of the image elements of the left view and that the light rays of the right and left image elements are brought to the right and left eyes respectively of an observer by virtue of optical elements such as polarizing elements which are appropriate to produce this result and which are described more in detail herein below. By having the individual polarizing elements adjacent the image screen of a small size, they can be made scarcely, if at all, visible to the eyes of the observer at normal viewing distance of the projected picture and when the individual polarizing elements are positioned opposite to the right and left image elements on the image screen, light from the right image elements can be directed through polarizing elements of one character while light from the left image elements can be directed through polarizing elements of a different character so that the light from the right image elements has one polarity while the light from the left image elements has another polarity. By interposing a polarizing member appropriate to one of these polarities before one eye and a polarizing member appropriate to the light of the other polarity before the other eye of the observer, the right and left eyes will see only the right and left image elements respectively. And since the image elements are scarcely, if at all, discernible individually but blend with each other, the right eye will see only its right view and the left eye will see only its left view of the subject as in natural binocular vision and the effect of stereoscopic relief will be obtained.

It is an advantage of this invention that an observer who has only one eye will not see a blurred picture but will see a pictuie of the same type that is now viewable on motion picture screens. Moreover, one who does not view the image screen through polarizing elements will observe the picture projected on the image screen without blur, or other defect, the only feature lacking being the lack of stereoscopic relief which can be attained by viewing the image screen through a viewing screen or glasses containing appropriate polarizing members.

Further purposes, features, and advantages of this invention will become apparent from the following description of certain illustrative embodiments of this invention shown in the accompanying drawings wherein Fig. 1 is a diagrammatic plan view of one form of apparatus for projecting a picture so as to be viewable in stereoscopic relief.

Fig. 2 is a diagrammatic side view of the apparatus shown in Fig. 1.

Fig. 3 is a front view indicating diagrammatically one form of arrangement of the screen polarizing elements adjacent the image screen.

Fig. 4 is a front view indicating diagrammatically an alternate arrangement of the screen polarizing elements adjacent the image screen.

Fig. 5 is a diagrammatic plan view of an alternate form of apparatus including a translucent image screen.

Fig. 6 is a diagrammatic plan view of a further alternate form of apparatus employing a grating to space the rays falling on the image screen.

Fig. 7 is a front view showing diagrammatically one form of grating which may be used in connection with the apparatus shown in Fig. 6.

Fig. 8 is a front view showing diagrammatically an alternate form of grating which may be used.

Fig. 9 is a plan view of a further alternate form of apparatus employing a lenticular screen to space the rays falling on the image screen.

Fig. 10 is a front view showing diagrammatically one form of lenticular screen for use in the apparatus shown in Fig. 9.

Fig. 11 is a front view showing diagrammatically an alternate form of lenticular screen for use in the apparatus shown in Fig. 10.

Figure 12 is a front view showing diagrammatically an alternate arrangement of polarizing elements adjacent the image screen.

In the drawings no attempt has been made to show the parts in proper relative size inasmuch as the drawings are diagrammatic. In Figs. 1 and 2 means are shown for projecting a right view of a subject and a left view of the subject. Such projecting means includes light sources 15 and 16, transparent right and left stereograms 17 and 18, and lens means 19 and 20 adapted to project the right and left stereograms on the image screen 21.

The stereograms 17 and 18 may be made in any desired way as by photographing a subject with an ordinary binocular camera. Alternatively a monocular camera may be used and successive photographs taken of the subject while the camera is at successively different lateral positions so that the views taken correspond with the views that are observable by the eyes of an observer for example. By increasing or diminishing the spacing of the views the stereoscopic effect can be made greater or less than that is normally observed with the eyes.

The light which has passed through the right stereogram 17 passes through the polarizing element 22, which because it is associated with the projector part of the apparatus is referred to herein as the right view projector polarizing member. This member and other right view members or elements are indicated by a cross. The light which emerges from member 22 is polarized and travels toward the screen 21 polarized in a first plane. Light rays polarized in this plane are indicated by dot and dash. Similarly light from the left view stereogram is passed through left polarizing member 23. This element and other left view members or elements are indicated by a circle. These light rays (indicated by dashed lines) pass toward screen 21 polarized in a plane but the plane of polarization is different from that of the light of the projected right view and preferably differs by about 90° therefrom.

In order to insure that the right and left views are observable by the right and left eyes respectively of an observer, there are positioned adjacent the screen 21 screen polarizing elements which resolve the right and left views into independent image elements. Thus the rays of light from the right stereogram after having been polarized by member 22 passes through right view screen polarizing elements 24 which permit to pass therethrough light of the same polarity as the light passing through member 22. Similarly left view screen polarizing elements 25 permit to pass therethrough light of the same polarity as passed through member 23. However, elements 24 do not permit to pass therethrough light of the polarity produced by member 23 and elements 25 do not permit to pass therethrough light of the polarity produced by member 22. It is apparent, therefore, that there is produced in the screen 21 a plurality of right and left image elements which are independent of each other.

It is also apparent that the light striking the screen 21, which in this embodiment is a reflecting screen, is reflected back through the same polarizing elements 24 and 25 and that the light from the right view image elements is of the same polarity as that which passed through member 22 and is of a different polarity from the light passing from the left view image elements on the screen 21 which is reflected back through elements 25 and which is of substantially the same polarity as the light that passed through member 23. An observer having right and left eyes 26 and 27 respectively views the viewing screen 21 through viewing polarizing members 28 and 29, the member 28 being adapted to permit to pass therethrough light of the same polarity which passed through member 22 and elements 24 but being opaque or substantially so to light that has passed through member 23 and elements 25; and the member 29 being adapted to permit to pass therethrough light of the same polarity which passed through member 23 and elements 25 and being opaque or substantially so to light which passed through member 22 and element 24. Therefore since the right eye of the observer can only see light corresponding to the right view of the subject and the left eye can only see light corresponding to the left view of the subject, the observer, provided his eyesight is normal, will see the projected image of the subject in full stereoscopic relief.

In order that the projected image may appear continuous the screen elements 24 and 25 can be made quite small. The size of these elements depends for the most part on the size of the installation, inasmuch as the elements can be made considerably larger for a theater than for motion pictures projected in the home, for example. Ordinarily it is desirable to have the elements 24 and 25 sufficiently small so as not to interfere with the observation of an apparently continuous image when the screen is viewed from the normal viewing distance.

It is apparent that any other observer having right and left eyes 26' and 27' can also see the projected picture in stereoscopic relief through right and left view polarizing members 28' and 29'.

The elements 24 and 25 may be of any desired shape and arrangement. In Figs. 1, 2 and 3 the elements 24 and 25 are in the form of strips or bars. However, to avoid any tendency to streak, other arrangements may be used such as illustrated in Fig. 4 wherein elements 30 and 31 are of the form shown and permit light of different polarities to pass therethrough as above described in connection with elements 24 and 25. Also instead of arranging the elements vertically or horizontally, they may be disposed at other angles such as 45° to the horizontal as shown in Figure 12, wherein right view screen polarizing elements 74 and left view screen polarizing elements 76 are arranged as shown for the purpose above described. This applies to the embodiments hereinafter described as well as to the embodiments which have been described above. Likewise when the screen polarizing elements are in the form of bars or strips of the type shown in Fig. 3, they may be disposed horizontally instead of vertically or at any other desired angle to the vertical.

Any suitable type of material adapted to act as polarizing elements or members may be used as the polarizing elements or members in the practice of this invention. Thus there are natural minerals which are well known and which have the property of transmitting light of only one polarity therethrough. Also materials having as a base glass or other transparent material such as cellulose esters are known and on the market which are adapted to act as polarizing elements and to result in light rays of different polarity of the character described. The right view polarizing members and elements may be adapted so as to polarize light in one plane which is vertical and the left view polarizing elements and members may be adapted to polarize light in another plane which is horizontal. Alternatively, the right view polarizing elements and members may be adapted to polarize light in a first plane 45° to the vertical and the left view polarizing elements and members may be adapted to polarize light in a second plane differing by 90° from the first plane. Moreover, any other suitable relative planes of polarization may be utilized in the manner herein described. This applies to embodiments of this invention described both hereinabove and hereinbelow.

An alternative embodiment is shown in Fig. 5 wherein a subject is projected onto a translucent screen and viewed in stereoscopic relief according to this invention. Light rays from light sources 32 and 33 pass through polarizing members 34 and 35 respectively which are adapted to transmit light in different planes of polarization. The polarized light passes through right and left stereograms 77 and 78 and then through projectors 36 and 37 as shown which project the right and left stereograms in superimposed relation on the translucent screen 38. Light from the right and left stereograms is broken up into independent right and left image elements on the screen 38 by the resolving screen polarizing elements 39 and 40. The elements 39 permit light to pass therethrough of the polarity resulting from member 34 but not from 35 and elements 40 permit to pass therethrough light rays of the polarity resulting from member 35 but not from 34. The right and left image elements on screen 38 are visible from the opposite side of the screen from the projectors. On the opposite side of the screen 38 from the resolving screen elements 39 and 40 are selective screen polarizing elements 42 and 43 which correspond in size and position to the elements on the opposite side of the image screen 38. The elements 42 and 43 polarize light in different planes. Preferably but not essentially elements 42 which are opposite elements 39 permit to pass therethrough light of the same polarity as that transmitted by elements 39 but are opaque to light transmitted by elements 40. Similarly elements 43 which are opposite elements 40 permit to pass therethrough light of the polarity transmitted by elements 40 but not by 39. The observer having right and left eyes at 44 and 45 respectively views the screen 38 through viewing polarizing members 46 and 47, the member 46 being adapted to permit the transmission therethrough of light that results from elements 42 but not from elements 43 and the member 47 being adapted to transmit light resulting from elements 43 but not from elements 42. The observer therefore sees the projected picture in full stereoscopic relief since light from the right stereogram is seen only by the right eye and the light from the left stereogram is seen only by the left eye.

If desired, the method and apparatus illustrated in connection with Figure 1 may be combined with the apparatus above described (operative per se) in connection with Figure 5. In other words, a screen can be used which has both reflecting and translucent properties. Right and left stereograms could be projected on the front thereof and viewed in stereoscopic relief by reflected light as illustrated in connection with Figs. 1 and 2 and superimposed projected right and left pictures could be projected onto the other side of the screen and simultaneously viewed in stereoscopic relief by light transmitted through the screen as illustrated in connection with Fig. 5. For example, the apparatus shown in Fig. 5 could be made so as to include not only the projectors 36 and 37 on the far side of the screen 38 from the observer and described hereinabove but also projectors on the same side of the screen 38 as the observer and of the same type shown in Fig. 1, namely, including light sources 15' and 16', right and left stereograms 17' and 18' (in this case the same as stereograms 77 and 78), lens means or projectors 19' and 20' and polarizing members 22' and 23'. In this manner greater intensity of illumination can be obtained inasmuch as light directed onto screen 38 by projectors 36 and 37 and which pass through the screen 38 to the observer is supplemented by light directed onto the screen 38 by projectors 19' and 20' and reflected from the screen 38 to the observer.

As shown, the viewing polarizing members 46 and 47 can be arranged as a permanent screen which may be placed in front of the different rows of seats in a theater, the width of the elements being appropriate to the spacing of the eyes. In this manner, the wearing of viewing glasses can be avoided. However, the use of viewing glasses worn by the observer gives greater latitude of movement by the observer and is to be preferred. Moreover, with viewing glasses worn by the observer there is no danger of obtaining pseudoscopic effects.

In the foregoing embodiments of this invention, reference has been made to two projection sources. It is apparent, however, that any means for projecting right and left stereograms polarized in different planes either simultaneously or in rapid succession from any suitable projecting means may be used. It is also apparent that any suitable means for polarizing light and for producing polarized light in different complementary planes or opposed conditions of polarization may be used. In any such case light rays carrying the right view of the subject are caused to be polarized in one polarity while light rays carrying the left view of the subject are caused to be polarized in a different polarity as hereinabove described.

An alternate embodiment of this invention is shown in Fig. 6. In this embodiment independent elements of left and right stereograms are produced on an image screen in a different way, namely, by use of a ray spacing optical structure. In the illustrated example light from light sources 50 and 51 is passed through right and left stereograms 52 and 53, the stereograms being projected by projectors 54 and 55 in superimposed relation on image screen 56. A ray spacing resolving screen indicated generally by the reference character 57 and composed of opaque bands 58 having transparent spaces 59 therebetween, is adjacent the screen 56 and between it and the projectors. Since the projectors 54 and 55 are spaced laterally with respect to the screen 56, the light from projector 54 falls on the screen 56 as a plurality of image elements 80 of the right stereogram. The light from projector 55 falls on screen 56 as a plurality of image elements 81 of the left stereogram. As shown, the left and right image elements are independent of each other and alongside of each other.

On the opposite side of the translucent screen 56 are screen polarizing elements. A plurality of elements 60 adapted to transmit light from image elements 80 so as to be of one polarity are placed in front of the image elements 80 on the image screen of the right stereogram. A plurality of elements 61 adapted to transmit light from image elements 81 so as to be of a different polarity are placed in front of image elements 81 of the left stereogram on the image screen. The observation of the projected picture is accomplished as hereinabove described. An observer having right and left eyes 62 and 63 views the screen 56 through viewing polarizing members 64 and 65, the member 64 being adapted to transmit light of the same polarity as that transmitted by elements 60 and being opaque or substantially so, to light of the polarity transmitted by elements 61, and the member 65 being adapted to transmit light of the same polarity as that transmitted by elements 61 but being opaque or substantially so to light transmitted by elements 60. The right and left eyes see respectively the right and left projected views of the subject, but the left eye does not see substantially the projected right view and the right eye does not see substantially the projected left view and the subject therefore appears in stereoscopic relief.

The type of screen 57 that is used may vary as desired. Ordinarily a grating such as that shown in Fig. 7 may be used containing opaque portions 58 such as bars with transparent portions 59 therebetween. In such case screen polarizing elements may be used such as those shown in Fig. 3 for example. Alternatively the screen 57 may have a different arrangement such as that shown in Fig. 8 wherein the opaque portions 66 alternate with the transparent portions 67 both vertically and horizontally. In such case screen polarizing elements on the opposite side of the translucent image screen should be in a similar general arrangement so as to effect the result described in connection with the device shown in Fig. 6.

In Fig. 9 a further embodiment of this invention is shown which is in general similar to that described in connection with Fig. 6. Where the parts in Fig. 9 correspond to those shown in Fig. 6 they have been indicated by like reference characters and description thereof will not be repeated. Instead of the grating 57 a resolving ray spacing screen is used which is indicated generally by the reference character 68 and which is in the form of a plurality of lens elements 69. The lens elements 69 are adapted to contract light from the projector 54 so as to fall on the image screen 56 as spaced image elements 70 of the right stereogram and to contract light from projector 55 (which is spaced laterally from projector 54 with respect to screen 56) so as to fall in the image screen 56 as spaced image elements 71 of the left stereogram which are independent of image elements 70. The right view screen polarizing elements 60 are in front of right image elements 70 and the left view screen polarizing elements 61 are in front of left view image elements 71. It is apparent that the light from the right view image elements on the image screen 56 is observable only in light of a substantially different polarity from the light from left view image elements, thus enabling the observer by the use of the appropriate viewing polarizing members to observe the projected picture in stereoscopic relief as above described in connection with the description of Fig. 6. In the embodiment shown in Fig. 9 greater intensity of illumination and more complete utilization of light can be obtained. While the elements 70 and 71 are laterally contracted they can be made of sufficient smallness so that the eye, from the normal viewing distance, will not observe loss of detail or deformation. And, as hereinabove described, the left and right image elements respectively can be made of such size and proximity to each other as to appear substantially continuous when viewed from a distance.

The lenticular elements 69 may be in the form of lenticular ridges as shown in Fig. 10. However, it is to be understood that other forms of lenticular elements may be used in practicing this invention. For example, lenticular elements may be staggered as shown in Fig. 11 which shows the lenticular elements 72 arranged as shown in rows with the elements in one row offset from the next adjacent row.

Whether a grating is used as shown in Fig. 6 or a lenticular structure is used, as shown in Fig. 9, each accomplishes the spacing of rays of light of the right and left views of the subject so as to fall on the screen as image elements, the right view image elements being independent of the left view image elements and each may be referred to as a ray spacing optical structure.

While this invention has been described in connection with polarizing members and the use of polarizing members is greatly to be preferred, other light filtering means may be used so that the rays of light of the right view of the subject may be of a different character from the rays of light of the left view of the subject. In such case the light filtering means may be disposed as a plurality of screen elements as aforesaid. For example, the elements and members indicated by a cross (the right view) may be made of a complementary color with respect to the elements and members indicated by a circle. In fact any means may be used for forming a plurality of independent left and right image elements upon an image screen, and using a plurality of optical elements adapted to transmit light rays therethrough of a first character by which the right image elements may be viewed and using a plurality of optical elements adapted to transmit therethrough light of a second character by which the left image elements may be viewed, and then viewing the light from the image elements through viewing members adapted to bring the right view to the right eye and to bring the left eye view to the left eye, the right eye viewing member being opaque or substantially so to light of said second character and the left eye viewing member being opaque or substantially so to light of said first character.

In the usual projection of pictures according to this invention the left and right image elements on the image screen are transitory, that is they exist only as long as a projecting source of light remains unabated. However, it is not beyond the scope of this invention to make a permanent record on the image screen of the left and right image elements as by having a light sensitive chemical at the image screen such as an ordinary photographic emulsion which can be developed in known ways and may constitute a permanent record of the left and right image elements. Positives of the elements could be made if desired by reverse printing or by transfer to another screen member. By viewing the left and right image elements through the appropriate left and right screen elements adapted to transmit light of selected and differing character such as light polarized in planes at approximately right angles to each other and then through corresponding viewing members appropriate for the right and left eyes of an observer as hereinabove described in detail, stereoscopic observation of a photographed subject may be afforded. The left and right image elements to be recorded can be formed, for example, in any of the ways above described and illustrated in connection with the drawings. Moreover, instead of first making left and right stereograms, light from the subject itself may be broken up into image elements, and then viewed as produced, or after permanent recording, through the screen elements and viewing members as above described. Likewise it is apparent that any means for projecting an image onto a screen may be used in the practice of this invention.

What I claim is:

1. Apparatus for projecting a picture of a subject so as to be viewable in stereoscopic relief which comprises an image screen, left view projector means adapted to project a left view of the subject onto said image screen, right view projector means adapted to project a right view of the subject onto said image screen, means for causing said left view and right views to be broken up into a plurality of image elements on said image screen, the elements of the left view being substantially independent of and distributed among the elements of the right view and the elements of said left view as one group and the elements of said right view as another group being of such size and proximity to each other that the elements of each group have the appearance on the image screen of a substantially continuous projected image of the subject when the image screen is viewed from a distance, a plurality of left view screen elements adjacent said screen located with reference to said image screen in correspondence with the location of said left view image elements on said screen which left view screen elements are adapted to transmit light from said left view image elements so as to be of a first character and render said left view image elements visible therethrough, right view screen elements adjacent said screen located with reference to said screen in correspondence with the location of said right view image elements on said screen which right view screen elements are adapted to transmit light from said right view image elements so as to be of a second character and render said right view image elements visible therethrough, a left view viewing member adapted to transmit light of said first character passed through said left view screen elements in travelling from said left view image elements on said screen to and through said left view viewing member and a right view viewing member adapted to transmit light of said second character passed through said right view screen elements in travelling from said right view image elements on said screen to and through said right view viewing member, said right view viewing member being adapted to prevent the passage therethrough of light of said first character and said left view viewing member being adapted to prevent the passage therethrough of light of said second character.

2. Apparatus for projecting a picture of a subject so as to be viewable in stereoscopic relief which comprises an image screen, left view projector means adapted to project a left view of the subject onto said image screen, right view projector means adapted to project a right view of the subject onto said image screen, means for causing said left view and right views to be broken up into a plurality of image elements on said image screen, the elements of the left view being substantially independent of and distributed among the elements of the right view and the elements of said left view as one group and the elements of said right view as another group being of such size and proximity to each other that the elements of each group have the appearance on the image screen of a substantially continuous projected image of the subject when the image screen is viewed from a distance, a plurality of left view screen polarizing elements adjacent said image screen located with reference to said image screen in correspondence with the location of said left view image elements on said screen which left view polarizing elements are adapted to render said left view image elements visible therethrough, a plurality of right view screen polarizing elements adjacent said image screen located with reference to said screen in correspondence with the location of said right view image elements on said screen which right view polarizing screen elements are adapted to render said right view image elements visible therethrough, a left view viewing polarizing member adapted to transmit light transmitted by said left view screen polarizing elements, a right view viewing polarizing member adapted to transmit light transmitted by said right view screen polarizing elements, said right view viewing member being adapted to prevent the passage therethrough of light transmitted by said left view screen polarizing elements and said left view viewing member being adapted to prevent the passage therethrough of light transmitted by said right view screen polarizing elements.

3. Apparatus for projecting a picture of a subject so as to be viewable in stereoscopic relief which comprises an image screen, left view projecting means adapted to project a left view of the subject upon said image screen, right view projecting means adapted to project a right view of the subject upon said image screen, means adjacent said left view projecting means for polarizing light projected by said left view projecting means so as to be of a first polarity, means adjacent said right view projecting means for polarizing the light projected by said right view projecting means so as to be of a second polarity, a plurality of left view screen polarizing elements adjacent said image screen adapted to transmit to said image screen light of said first polarity as a plurality of left view image elements of such size and proximity to each other as to have the appearance on said image screen of a substantially continuous projected image of the subject when the image screen is viewed from a distance, a plurality of right view screen polarizing elements adjacent said image screen adapted to transmit to said image screen light of said second polarity as a plurality of right view image elements independent of and distributed among said left view image elements and of such size and proximity to each other as to have the appearance on said image screen of a substantially continuous projected image of the subject when the image screen is viewed from a distance, said right view screen polarizing elements being adapted to prevent the passage therethrough of light of said first polarity and said left view screen polarizing elements being adapted to prevent the passage therethrough of light of said second polarity, a plurality of left view screen polarizing elements adapted to transmit light of one polarity from said left view image elements and render same visible therethrough, a plurality of right view screen polarizing elements adapted to transmit light of another polarity from said right view image elements and render same visible therethrough, a left view viewing polarizing member adapted to transmit light transmitted by said last-mentioned left view screen polarizing elements, a right view viewing polarizing member adapted to transmit light transmitted by said last-mentioned right view screen polarizing elements, said right view viewing polarizing member being adapted to prevent the passage therethrough of light transmitted by said last-mentioned left view screen polarizing elements and said left view viewing polarizing member being adapted to prevent the passage therethrough of light transmitted by said last-mentioned right view screen polarizing elements.

4. Apparatus for projecting a picture of a subject so as to be viewable in stereoscopic relief which comprises a reflecting image screen, means for projecting light rays of a left view of a subject upon the image screen, the light rays being of a first polarity a plurality of left view screen polarizing elements between said projecting means and said screen and adjacent said screen which are of such size and proximity to each other as to appear substantially continuous when viewed from a distance and which are adapted to transmit light of said first polarity, a first viewing polarizing member adapted to transmit light of said first polarity reflected from said image screen back through said polarizing elements, means for projecting light rays of a right view of the subject upon the image screen, said light rays being of a second polarity different from said first polarity, a plurality of right view screen polarizing elements between said means for projecting said right view and said image screen and adjacent said image screen interspersed between said left view polarizing elements which are of such size and proximity to each other as to appear substantially continuous when viewed from a distance and which are adapted to transmit light of said second polarity, and a second viewing polarizing member adapted to transmit light of said second polarity, said left view polarizing elements and said first viewing polarizing member being adapted to prevent light of said second polarity from passing therethrough and said right view polarizing elements and said second viewing polarizing member being adapted to prevent the passage of light of said first polarity therethrough.

5. Apparatus for projecting a picture of a subject so as to be viewable in stereoscopic relief which comprises a translucent image screen, means for projecting light rays of a left view of the subject upon the image screen, said light rays being of a first polarity, a plurality of left view resolving polarizing screen elements adjacent said screen and between said screen and said means for projecting said left view which are of such size and proximity to each other as to appear substantially continuous when viewed from a distance and which are adapted to transmit light of said first polarity, means for projecting light rays of a right view of the subject upon the image screen, said light rays being of a second polarity, a plurality of right view resolving screen polarizing elements adjacent said screen and between said screen and said means for projecting said right view and interspersed between said left view resolving screen polarizing elements and which are of such size and proximity to each other as to appear substantially continuous when viewed from a distance and which are adapted to transmit light of said second polarity, said right view resolving screen polarizing elements being adapted to prevent the passage therethrough of light of said first polarity and said left view resolving screen polarizing elements being adapted to prevent the passage therethrough of light of said second polarity, a plurality of left view selective screen polarizing elements substantially complementary to said left view resolving screen polarizing elements and on the opposite side of said image screen therefrom adapted to transmit light of one polarity, a plurality of right view selective screen polarizing elements substantially complementary to said right view selective screen polarizing elements and on the opposite side of said image screen therefrom adapted to transmit light of a different polarity than light transmitted by said left view screen polarizing elements, a left view viewing polarizing member further removed from said image screen than said left view selective screen polarizing elements adapted to transmit light transmitted by said left view selective screen polarizing elements and to prevent the passage therethrough of light transmitted by said right view selective screen polarizing elements, and a right view viewing polarizing member further removed from said image screen than said right view selective screen polarizing elements adapted to transmit light transmitted by said right view selective screen polarizing elements and to prevent the passage therethrough of light transmitted by said left view selective screen polarizing elements.

6. Apparatus for projecting a picture so as to be viewable in stereoscopic relief which comprises a translucent image screen, projector means laterally spaced with respect to said image screen on which image screen said projectors are adapted to project left and right views of a subject, a ray spacing resolving screen between said projectors and said image screen and adjacent said image screen in the form of alternate opaque and translucent portions and adapted to cause left and right pictures projected on said image screen from said projector means to fall on said image screen as a plurality of left and right image elements substantially independent of each other, said left image elements as a group and said right image elements as a group being of such size and proximity as to appear on said image screen as a substantially continuous projected image of said subject when viewed from a distance, a plurality of left view screen polarizing elements adapted to transmit light from said left view image elements so as to be of a first polarity and render said left view image elements visible therethrough, a plurality of right view screen polarizing elements adapted to transmit light from said right view image elements so as to be of a second polarity and render said right view image elements visible therethrough, a left view viewing member adapted to transmit light of said first polarity, a right view viewing member adapted to transmit light of said second polarity therethrough, said right view viewing member being adapted to prevent the passage therethrough of light of said first polarity and said left view viewing member being adapted to prevent the passage therethrough of light of said second polarity.

7. Apparatus for projecting a picture so as to be viewable in stereoscopic relief which comprises a translucent image screen, projector means laterally spaced with respect to said image screen on which image screen said projector means are adapted to project left and right views of a subject, a ray spacing resolving screen between said projector means and said image screen and adjacent said image screen in the form of lenticular elements adapted to contract rays of light striking the individual lens elements thereof and cause the projected left view and right views from said laterally spaced projector means to be broken up into left and right image elements substantially independent of each other on said image screen, said left image elements as a group and said right image elements as a group being of such size and proximity as to appear on said image screen as a substantially continuous projected image of said subject when viewed from a distance, a plurality of left view polarizing elements adapted to transmit light from said left view image elements so as to be of a first polarity and render said left view image elements visible therethrough, a plurality of right view screen polarizing elements adapted to transmit light from said right view elements so as to be of a second polarity and render said right view image elements visible therethrough, a left view viewing member adapted to transmit light of said first polarity, a right view viewing member adapted to transmit light of said second polarity therethrough, said right view viewing member being adapted to prevent the passage therethrough of light of said first polarity and said left view viewing member being adapted to prevent the passage therethrough of light of said second polarity.

8. In apparatus for observing a picture in stereoscopic relief, the combination comprising an image screen and adjacent a surface of said image screen a multiplicity of first polarizing elements adapted to transmit light of one polarity and of such size and proximity as to appear substantially continuous when viewed from a distance, and a multiplicity of second polarizing elements which are adapted to transmit light of a second polarity and are interspersed among said first polarizing elements and are of such size and proximity as to appear substantially continuous when viewed from a distance, said first polarizing elements being adapted to prevent the passage therethrough of light of said second polarity, and said second polarizing elements being adapted to prevent the passage therethrough of light of said first polarity.

9. A method of projection of a picture of a subject so as to be viewed in stereoscopic relief which comprises projecting left and right views of a subject upon an image screen, said left view being broken up into a plurality of image elements on said image screen and said right view being broken up into a plurality of right view image elements on said image screen distributed among and independent of said left view image elements, and causing said left and right image elements thus produced by said projection of said left and right views of the subject on said image screen to be viewable by the left and right eyes respectively of an observer by polarizing light from said left view image elements on said image screen so as to be of a first polarity and polarizing light from said right view image elements on said image screen so as to be of a second polarity, light of said first polarity being transmitted to the left eye of the observer through a polarizer which prevents light of said second polarity from reaching said left eye and light of said second polarity being transmitted to the right eye of the observer through a polarizer which prevents light of said first polarity from reaching said right eye of the observer.

10. A method of projecting a picture of a subject so as to be viewable in stereoscopic relief which comprises projecting left and right views of a subject upon an image screen, said projected left view being broken up by contraction of a plurality of bundles of light rays of said projected left view to form a plurality of spaced left view image elements on said image screen, said projected right view being broken up by contraction of a plurality of bundles of light rays of said projected right view to form a plurality of spaced right view image elements on said image screen independent of and between said left view image elements on said image screen, and causing said left and right image elements thus produced by said projection of said left and right views of the subject on said image screen to be viewable by the left and right eyes respectively of an observer by polarizing light from said left view image elements on said image screen so as to be of a first polarity and polarizing light from said right view image elements on said image screen so as to be of a second polarity, light of said first polarity being transmitted to the left eye of the observer through a polarizer which prevents light of said second polarity from reaching said left eye and light of said second polarity being transmitted to the right eye of the observer through a polarizer which prevents light of said first polarity from reaching said right eye of the observer.

11. In apparatus for observing a picture in stereoscopic relief, the combination comprising a translucent image screen, a ray-spacing resolving screen spaced from said image screen and comprising a plurality of lenticular elements adapted to cause rays of light of a projected subject to converge and fall on said screen as a plurality of image elements of such size and proximity as to appear substantially continuous when viewed from a distance with each image element at most approximately half the width of the lens element producing the image element, and on the other side of said image screen a plurality of first polarizing elements adapted to transmit light from said image screen so as to be of a first polarity and a plurality of second polarizing elements adapted to transmit light from said image screen so as to be of an opposed polarity, said first and second polarizing element being disposed in pairs with the individual pairs being located in correspondence with the location of said lenticular elements and each pair consisting of a first and second polarizing element disposed substantially side by side adjacent said image screen.

12. In apparatus for observing a picture in stereoscopic relief, the combination according to claim 11 wherein the lenticular elements of the resolving screen are substantially contiguous lenticular ridges and the first and second polarizing elements are substantially contiguous strips disposed in a direction corresponding to that of the ridges.

RICHARD K. PARSELL.